(12) United States Patent
Nagura

(10) Patent No.: US 7,787,332 B2
(45) Date of Patent: Aug. 31, 2010

(54) OPTICAL INFORMATION RECORDING-REPRODUCING APPARATUS

(75) Inventor: Chihiro Nagura, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 339 days.

(21) Appl. No.: 12/131,692

(22) Filed: Jun. 2, 2008

(65) Prior Publication Data
US 2008/0304396 A1 Dec. 11, 2008

(30) Foreign Application Priority Data
Jun. 7, 2007 (JP) .............................. 2007-151642

(51) Int. Cl.
*G11B 7/00* (2006.01)
(52) U.S. Cl. .................................. 369/44.23
(58) Field of Classification Search ........................ None
See application file for complete search history.

(56) References Cited

U.S. PATENT DOCUMENTS

| | | | | |
|---|---|---|---|---|
| 6,097,691 | A * | 8/2000 | Shimozono | 369/112.24 |
| 6,728,172 | B2 * | 4/2004 | Ikenaka et al. | 369/44.23 |
| 7,145,847 | B2 | 12/2006 | Nagura et al. | 369/44.26 |
| 2003/0067861 | A1 * | 4/2003 | Kimura | 369/112.26 |
| 2005/0265152 | A1 * | 12/2005 | Hirai | 369/44.37 |
| 2007/0217300 | A1 | 9/2007 | Koyama et al. | 369/44.23 |

FOREIGN PATENT DOCUMENTS

| | | |
|---|---|---|
| JP | 2002-312971 | 10/2002 |
| JP | 2003-91847 | 3/2003 |
| JP | 2003-131113 | 5/2003 |
| JP | 2005-327396 | 11/2005 |

* cited by examiner

*Primary Examiner*—Peter Vincent Agustin
(74) *Attorney, Agent, or Firm*—Fitzpatrick, Cella, Harper & Scinto

(57) ABSTRACT

An optical information recording-reproducing apparatus comprising a light source, an objective lens for condensing a light beam from the light source on a recording layer of an optical recording medium, a divergence angle-converting element provided in an optical path from the light source to the optical recoding medium for converting a divergence angle of the light beam to be introduced to the objective lens, a focus error detecting optical system including a photodetector for detecting a focus error of the light beam, an optical element for introducing a part of the light beam emitted from the divergence angle-converting element to the focus error detecting optical system, a circuit for detecting the divergence angle of the light beam emitted from the divergence angle-converting element from output from the photodetector, and a circuit for compensating spherical aberration in the recording layer of the optical recording medium by driving the divergence angle-converting element in accordance with the detection result of the divergence angle-detecting circuit.

5 Claims, 9 Drawing Sheets

OPTICAL INFORMATION RECORDING-REPRODUCING APPARATUS

BACKGROUND OF THE INVENTION

1. Field of the Invention

The present invention relates to an optical information recording-reproducing apparatus which records or reproduces information optically on an optical recording medium like an optical disk. In particular, the present invention relates to an optical information recording-reproducing apparatus in which spherical aberration caused by thickness variation of a cover layer of an optical recording medium is compensated. The present invention relates also to a method of compensation of the spherical aberration in the optical information recording and reproduction.

2. Description of the Related Art

An optical high-density recording process is commercialized which uses a blue-violet semiconductor laser of a wavelength of about 407 nm and an objective lens of NA=0.85. In such a process, being different from processes employing a CD or a DVD, a slight error in the thickness of the cover layer of the optical disk will cause a great spherical aberration to make instable the recording and reproduction. This spherical aberration should be compensated.

For example, Japanese Patent Application Laid-Open No. 2002-312971 discloses a method of compensating the spherical aberration by adjusting the divergence angle of a light beam introduced to the objective lens by driving a collimator lens or a beam expander lens in the optical axis direction.

The spherical aberration can be optimized by adjusting the amplitude of a push-pull signal or an RF signal. However, when the spherical aberration is greater, the focusing is difficult and the optimization of the spherical aberration is prevented. For compensation of the spherical aberration, the initially set standard position of the lens (of the movable part) should be detected.

Japanese Patent Application Laid-Open Nos. 2003-91847 and 2003-131113 disclose use of a photo-interrupter for detecting the standard position. FIG. 10 illustrates the constitution for the detection. As illustrated in FIG. 10, stepping motor 122 drives concave lens 116a of expander lens system 116 through leading screw mechanism 123 and rack 124. With the photo-interrupter fixed on holder 125a of concave lens 116a kept apart from photosensor 128, the light beam emitted from the LED in photosensor 128 reaches the photodiode without interruption of the light beam. In this state, the output from the photosensor is at a high level. On the other hand, with the photo-interrupter placed between the LED and the photodiode, the light emitted by the LED is interrupted to lower the output level of photosensor 128 to a low level. From the output level, the standard position of the movable part can be detected.

Japanese Patent Application Laid-Open No. 2005-327396 discloses a method of detection of a divergence angle of the light beam by separating a part of the light beam penetrating through a beam expander (first and second collimator lenses), in place of mounting a position-detecting member.

The detection of the position of the lens according to the aforementioned Japanese Patent Application Laid-Open Nos. 2002-312971, 2003-91847, and 2003-131113 has disadvantages of a larger size of the apparatus due to a larger number of the constituting parts and the increase of the optical paths. For example, for use of the photo-interrupter, photo-interrupting parts and a photosensor are required.

The detection of a divergence angle by separating partly the light beam emitted from a beam expander as disclosed in Japanese Patent Application Laid-Open No. 2005-327396 requires a light-condensing optical system for condensing the separated light beam onto the detection sensor, and an optical path to the detection sensor in addition to the optical path for reading the information, resulting in a larger size of the optical system, disadvantageously.

SUMMARY OF THE INVENTION

The present invention intends to provide an optical information recording-reproducing apparatus in which spherical aberration is compensated with a smaller and simpler constitution of the apparatus.

The optical information recording-reproducing apparatus of the present invention comprises.

The present invention is directed to an optical information recording-reproducing apparatus comprising: a light source; an objective lens for condensing a light beam from the light source on a recording layer of an optical recording medium; a divergence angle-converting element provided in an optical path from the light source to the optical recoding medium for converting a divergence angle of the light beam to be introduced to the objective lens; a focus error detecting optical system including a photodetector for detecting a focus error of the light beam; an optical element for introducing a part of the light beam emitted from the divergence angle-converting element to the focus error detecting optical system; a circuit for detecting the divergence angle of the light beam emitted from the divergence angle-converting element from output from the photodetector; and a circuit for compensating spherical aberration in the recording layer of the optical recording medium by driving the divergence angle-converting element in accordance with the detection result of the divergence angle-detecting circuit.

The optical element can be a polarization-converting element for converting linear polarized light to circularly polarized light.

The focus error-detecting optical system can have an astigmatism-generating element.

The divergence angle-converting element can be a beam expander, a collimator lens, or a liquid crystal element. The collimator lens can function also as a condenser lens for condensing the light beam on the photodetector of the focus error-detecting optical system.

Further features of the present invention will become apparent from the following description of exemplary embodiments with reference to the attached drawings.

DESCRIPTION OF THE EMBODIMENTS

The best mode of carrying out the present invention is described below in detail with reference to drawings. In the present invention, the extent of adjustment by the divergence angle-converting element (spherical aberration-compensating optical system) is detected by a focus error-detecting optical system. Thereby, the apparatus can be made compact without employing a separate optical system, a photo-interrupter, and like parts.

Specifically, a light beam emitted from a divergence angle-converting element is partly turned back and introduced to a focus error-detecting optical system to obtain a detection signal (divergence angle detection signal) which varies with the focusing error of an objective lens depending on the divergence angle. The present invention utilizes this fact and compensates the spherical aberration in the recording layer of an optical recording medium by driving the divergence angle-converting element in accordance with the divergence angle detecting signal.

First Embodiment

Figure 1:
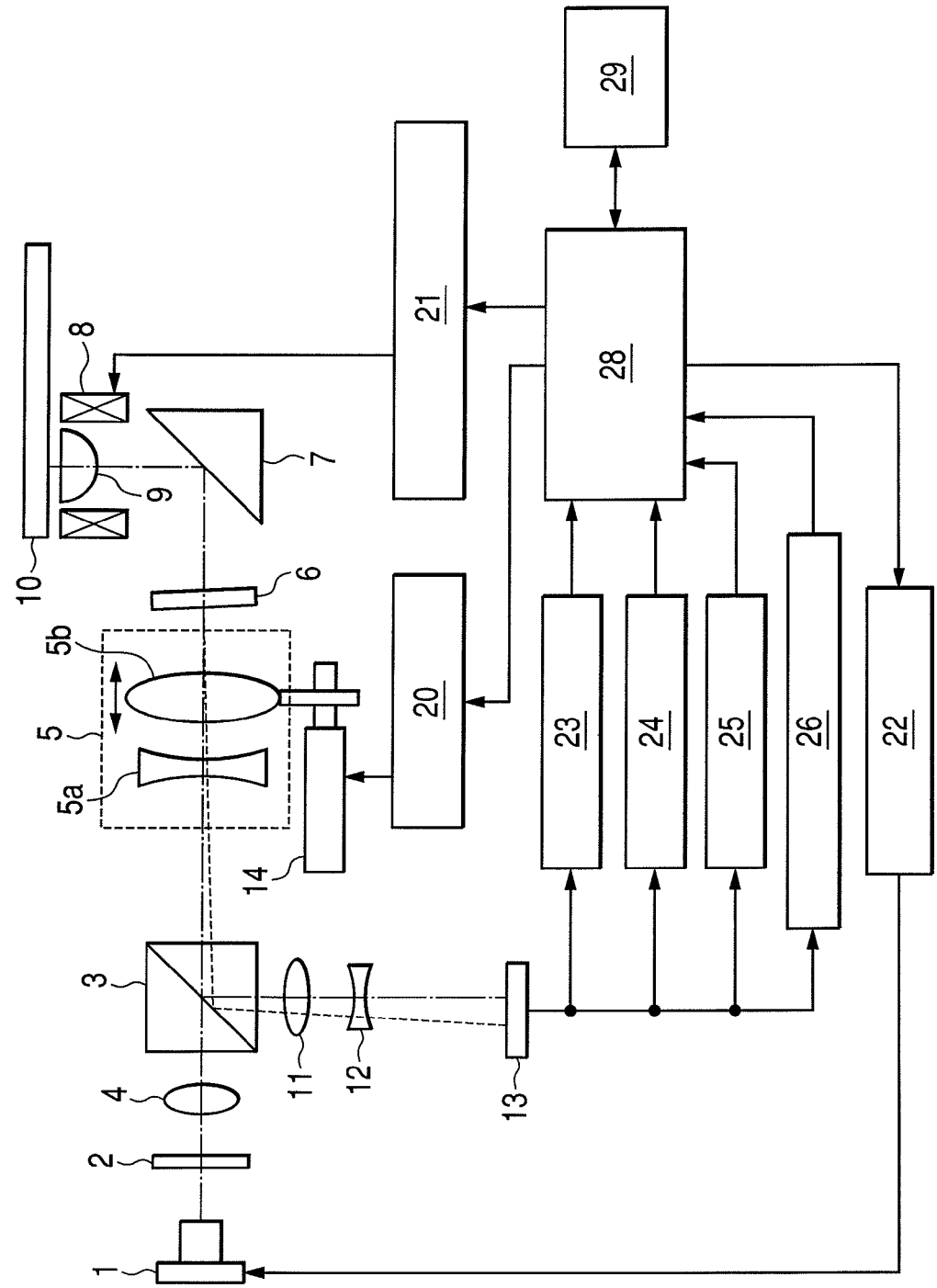
FIG. 1 is a block diagram illustrating First Embodiment of the optical information recording-reproducing apparatus of the present invention.

FIG. 1 is a block diagram of a first embodiment of the optical information recording-reproducing apparatus of the present invention. This apparatus contains light source 1, diffraction grating 2, polarization beam splitter 3, collimator lens 4, beam expander 5, quarter-wave plate 6, folding mirror 7, objective lens actuator 8, objective lens 9, optical disk 10, condenser lens 11, sensor lens 12, photodetector 13, and lens-driving mechanism 14.

Figure 11:
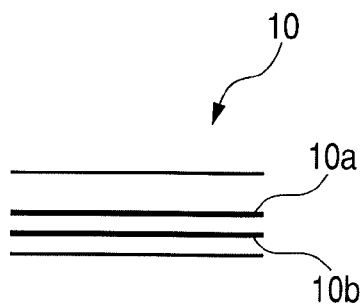
FIG. 11 illustrates schematically the two-layer structure of optical disk 10 shown in FIGS. 1, 4, 5, 6, and 8.

Semiconductor laser 1 as the light source emits a laser beam of a wavelength of, for example, 405 nm. Optical disk 10 as the information recording medium is a dual layered disk having first layer 10a and second layer 10b as illustrated in FIG. 11: second layer 10b being placed at the light-introduction side and having a light transmission layer of 75 μm thick, and first layer 10a being placed next to the second layer and having a light transmission layer of 100 μm thick. Beam expander 5 for compensating the spherical aberration is constituted of concave lens 5a and convex lens 5b. Convex lens 5b is driven in the optical axis direction by lens-driving mechanism 14 to change the lens interval between concave lens 5a and convex lens 5b. Otherwise, concave lens 5a may be driven instead of convex lens 5b.

Lens-driving mechanism 14 is constituted of a driving source (e.g., a stepping motor) and a gear or a like mechanism for converting the driving force for driving convex lens 5b linearly in the optical axis direction. Controller 28 controls SA (Spherical Aberration)-driving circuit 20 to actuate driving mechanism 14 to adjust the position of convex lens 5b in the optical axis direction for compensation of the spherical aberration in the recording layers of optical disk 10.

Quarter-wave plate 6 is fixed with inclination by an angle of 2.5 degrees relative to the optical axis, and is coated on the side facing toward beam-expander 5 not to reflect the light of the light source wavelength with the other side face uncoated. Objective lens 9 has an NA of 0.85, and is designed for non-aberration in an infinite system at transmission layer thickness of 87.5 μm. Objective lens actuator 8 has a biaxial driving mechanism for driving the objective lens in the focusing direction and the radius direction of optical disk 10. Objective lens 9 is held by objective lens actuator 8.

Figure 2:
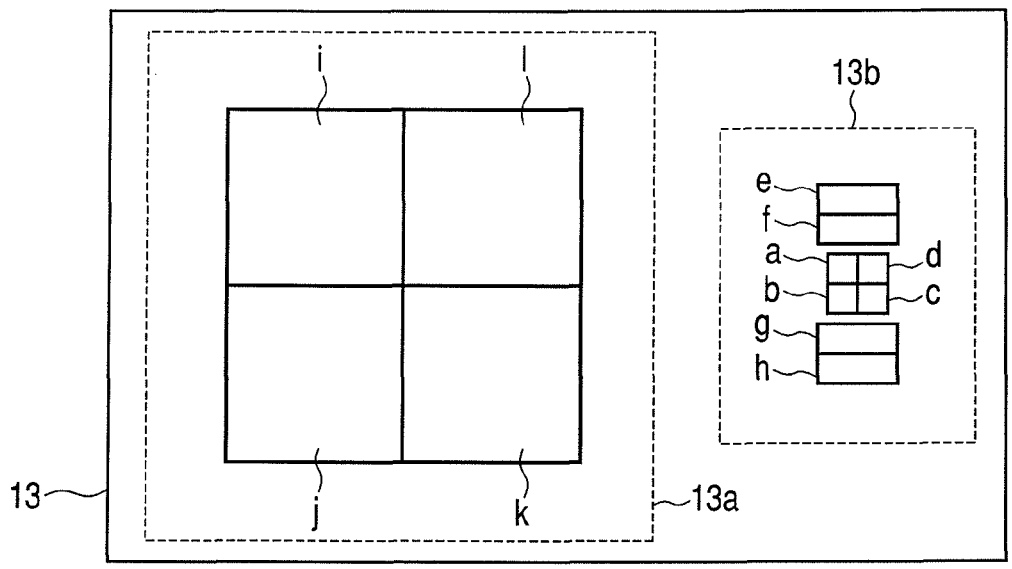
FIG. 2 illustrates a light-receiving surface of the photodetector shown in FIG. 1.

Sensor lens 12 is an astigmatism element which is constituted, for example, of a cylindrical lens, or a hologram element, and functions to cause astigmatism. Photodetector 13 has a light-receiving surface patterned as illustrated in FIG. 2, having light-receiving surface sections 13a and 13b. The specific constitution of photodetector 13 is described later. As mentioned above, the focus error-detecting optical system contains an astigmatism-producing element.

RF-detecting circuit 23 produces an RF-reproduction signal from the output of photodetector 13, as described later. Servo error-detecting circuit 24 produces a focus error signal and a tracking error signal similarly from the output of photodetector 13. Divergence angle-detecting circuit 25 produces a divergence angle signal similarly from the output of photodetector 13. Laser power monitor detecting circuit 26 produces a laser power monitor signal similarly from the output of photodetector 13 as described later.

Controller 28 has a controlling circuit for controlling the parts in the apparatus for recording or reading the information on or from optical disk 10. Further, controller 28 drives objective lens actuator 8 for focusing and tracking in accordance with the aforementioned focusing error signals and tracking error signals. In FIG. 1, the details of the constitution of the servo control are omitted. Further, controller 28 controls semiconductor laser 1 in accordance with the above-mentioned laser power monitor signals. In FIG. 1, the modulation circuit for modulating the recorded data according to a prescribed modulation system, and the demodulation circuit for the demodulation are omitted, and the spindle motor for rotating optical disk 11 are also omitted.

The light beam emitted from semiconductor laser 1 is converted to a collimated light beam by collimator lens 4, allowed to transmit through polarization beam-splitter 3, and introduced into beam expander 5 constituted of concave lens 5a and convex lens 5b. Beam expander 5, with convex lens 5b movable in the optical axis direction, is capable of varying the angle of divergence or convergence of the light beam to be introduced to objective lens 9.

The light beam, after transmission through beam expander 5, is introduced to quarter-wave plate 6, where a part of the light beam is separated by Fresnel reflection on the plate face on the light-emission side. The reflected light transmits backward again through quarter-wave plate 6. Thereby, the polarization direction of the reflected light is changed to be perpendicular to that of the introduced light. Quarter-wave plate 6, which is set with inclination relative to the optical axis direction, allows the optical axis of the separated light beam to deviate from that of the original beam transmission direction. This separated light beam is allowed to transmit again backward through beam expander 5, reflected by polarization beam splitter 3, allowed to pass through condenser lens 11 and sensor lens 12, and condensed on light-receiving surface section 13a of photodetector 13. Light-receiving surface section 13a produces a divergence angle signal and a laser power monitor signal as mentioned later.

On the other hand, the light beam which has transmitted through quarter-wave plate 6 is reflected upward by folding mirror 7, and is condensed by objective lens 9 on the information recording face of optical disk 10. The light reflected by optical disk 10 is introduced through objective lens 9, folding mirror 7, quarter-wave plate 6, and beam expander 5 to polarization beam splitter 3. The introduced light is reflected by polarization beam splitter 3, and is condensed through condenser lens 11 and sensor lens 12 onto light-receiving surface section 13b of photodetector 13. Light-receiving surface 13b outputs an RF reproduction signal, a focus error signals, and tracking error signal.

FIG. 2 illustrates a light-receiving surface of photodetector 13. The light-receiving surface section for receiving RF-servo contains four divisional sensors, a, b, c, and d, at the center portion, and two divisional sensor pairs: e and f, and g and h, at the both sides thereof. The light-receiving surface section for divergence angle detection and laser power monitoring contains four divisional sensors i, j, k, and l. The four divisional sensors i-l in light-receiving surface section 13a which receive also the sub-beam occupy a larger light-receiving area than that of four divisional sensors a-d of light-receiving surface section 13b.

The outputs from light-receiving surface sections a-l of photodetector 13 are denoted respectively by symbols A-L. Focus error signal FE is derived according to an astigmatism method by calculation by Equation 1 below.

$$FE=(A+C)-(B+D) \quad (1)$$

Tracking error signal TE is derived according to a differential push-pull method by calculation by the equation below.

$$TE=\{(A+D)-(B+C)\}-k\{(F-E)+(H-G)\} \quad (2)$$

The focus error signal and the tracking error signal are produced by servo error detection circuit 24 and are input to controller 28.

The RF reproduction signal is derived by summation calculation of four divisional sensors.

$$(RF\ \text{reproduction signal})=A+B+C+D \quad (3)$$

This RF reproduction signal is produced by RF detection circuit 23 as mentioned above, and is input to controller 28.

Further, the laser power monitor signal is derived by summation calculation of the outputs from four divisional sensors i-l.

$$(\text{Laser power monitor signal})=I+J+K+L \quad (4)$$

This laser power monitor signal is produced by laser power monitor signal-producing circuit 26 and is input to controller 28. The output of semiconductor laser 1 is controlled by APC in accordance with this laser power monitor signal.

Further, the divergence angle signal is derived by an astigmatism method by calculation by the equation below.

$$(\text{Divergence angle signal})=(I+K)-(J+L) \quad (5).$$

Figure 3:
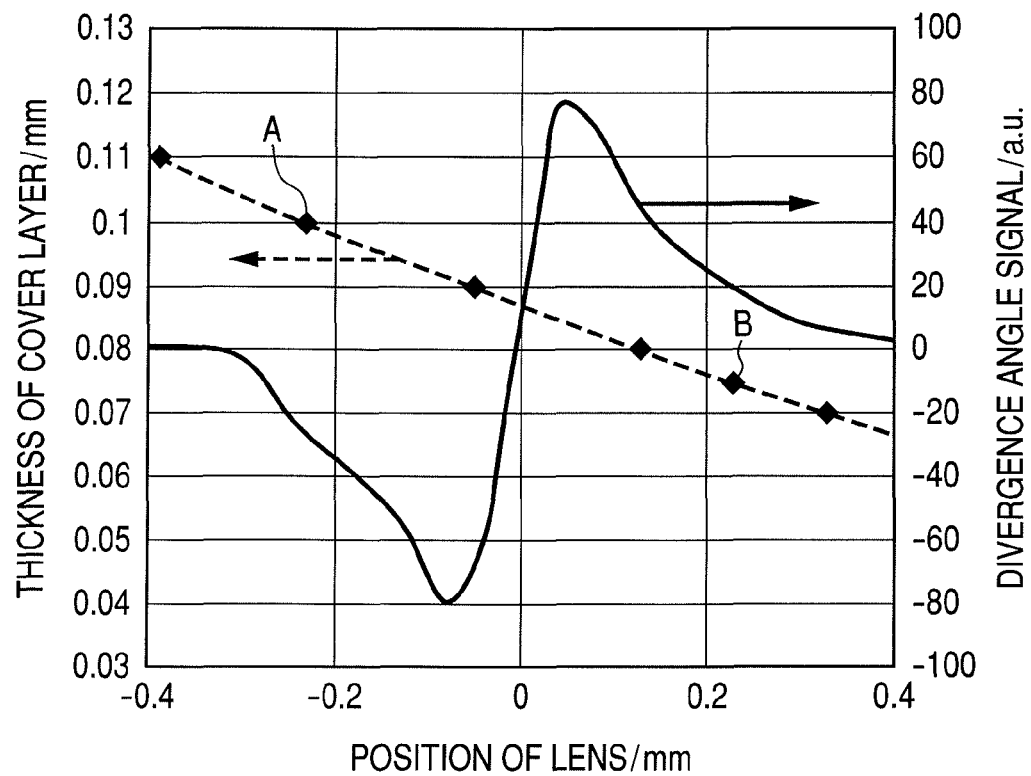
FIG. 3 is a graph showing dependence of the divergence angle signal and the optical cover layer thickness on the position of the convex lens of the beam expander.

This divergence angle signal is produced by divergence angle-detecting circuit 25 and is input to controller 28. FIG. 3 shows the relations of the obtained signal to the position of the convex lens of beam expander 5 and the optimum cover layer thickness.

The divergence angle depends on position of convex lens 5b of beam expander 5: the divergence signal varies along an S-shaped curve. At the position where the divergence angle of the light beam emitted from beam expander 5 is zero (the light beam is perfectly parallel), the signal comes to be zero-crossed. In this state, two sub-beams are simultaneously introduced to four divisional sensors i-l of light-receiving surface 13a, but the zero-cross position is not affected practically by the sub-beams since the beams are introduced nearly line-symmetrically.

As described above, a part of the light beam emitted from beam expander 5 (divergence angle-converting element) is turned back to the focus error detecting optical system containing photodetector 13 for detection of the focus error of the light beam. Divergence angle-detecting circuit 25 detects the divergence angle signal which behaves similarly as the focus error signal of objective lens 9 in accordance with the divergence angle of the light beam emitted from divergence angle-converting element as shown in Equation 5 based on the output of photodetector 13. The above constitution of the main portion of the present invention is common to the embodiments described below except that a collimator lens or a liquid crystal element is employed as the divergence angle-converting element.

Next, the operation of compensation of the spherical aberration by beam expander 5 is described below. Controller 28 conducts compensation of the spherical aberration in the recording layers of optical disk 10 at the time of power-on or after exchange of the optical disk.

Firstly the operation of compensation of the spherical aberration in first layer 10a of optical disk 10 is described firstly. Controller 28 adjusts the convex lens 5b of beam expander 5 to be at the standard position in accordance with the divergence angle signal from divergence angle-detecting circuit 24. That is, controller 28 controls SA-driving circuit 20 and detects the change of the divergence angle signal to place convex lens 5b at the standard position to obtain the divergence angle signal of zero by displacing convex lens 5b in the optical axis direction. At the standard position, the divergence angle of the light beam emitted from beam expander 5 is zero as mentioned above.

Next, the stepping motor (not shown in the drawing) of driving mechanism 14 is driven in a number of steps corresponding to the difference between the optimum cover layer thickness of 87.5 μm for an infinite system and the first layer thickness of 100 μm. That is, as described above, objective lens 9 having an NA of 0.85 comes to be in a state of non-aberration at the transmission layer thickness of 87.5 μm in an infinite system. Thereby as shown in FIG. 3, the standard position corresponds to the lens position at 0 (zero) and the cover layer thickness of 87.5 μm.

From this state, the lens is displaced at a distance (12.5 μm) corresponding to the difference from the transmission layer thickness of 100 μm of first layer 10a. Specifically in FIG. 3, the lens is displaced from the position 0 to position A in relation between the lens position and the optimum cover layer thickness, as indicated by the broken line in FIG. 3.

Then, controller 28 introduces focus- and tracking-servo to first layer 10a of optical disk 10, and detects the amplitude of the RF-reproducing signal from RF-detecting circuit 23. Thereby, the spherical aberration at first layer 10a of optical disk 10 is compensated by adjusting finely the position of convex lens 5b to maximize the amplitude of the RF-reproducing signal.

Subsequently, for compensation of the spherical aberration at second layer 10b of optical disk 10, convex lens 5b is displaced by a distance corresponding to the layer interval 25 μm between first layer 10a and second layer 10b of optical disk 10 by driving the stepping motor of driving mechanism 14 in the number of the steps corresponding to the layer interval (to point B in FIG. 3 in the relation between the lens position and the optimum thickness of the cover layer.

Then, controller 28 moves the focus point onto second layer 10b of optical disk 10 and detects similarly the amplitude of the RF-reproducing signal from RF-detecting circuit 23. Thereby, the spherical aberration at second layer 10b of optical disk 10 is compensated by adjusting finely the position of convex lens 5b to maximize the amplitude of the RF-reproducing signal.

As described above, the optical recording-reproducing apparatus of this Embodiment records or reproduces information by focusing the light beam emitted from the light source (semiconductor laser 1) by objective lens 9 on the recording layer of the optical recording medium (optical disk 10). This apparatus comprises a divergence angle-converting element (beam expander 5) for converting the divergence angle of the light beam introduced to objective lens 9, and a focus error-detecting optical system containing photodetector 13 for detecting the focus error of the light beam.

The optical recording-reproducing apparatus further comprises an optical element (quarter-wave plate 6) for introducing a part of the light beam emitted from the divergence angle-converting element to the focus error-detecting optical system, divergent angle-detecting circuit 25 for detecting the divergence angle of the light beam emitted from the divergence angle-converting element based on the output of photodetector 13, and controller 28 for compensating the spherical aberration in the recording layer of the optical recording medium by driving the divergence angle-converting element based on the result of detection by divergence angle-detecting circuit 15. In this embodiment, the optical element is a polarization-converting element for converting the linear polarized light to circularly polarized light. The divergence angle-converting element is beam expander 5.

According to this embodiment, the standard position in the divergence angle conversion in spherical aberration-compensating optical system can be detected with a simple device constitution, which renders unnecessary a photo-interrupter or a like optical part and makes the apparatus compact.

Second Embodiment

Figure 4:
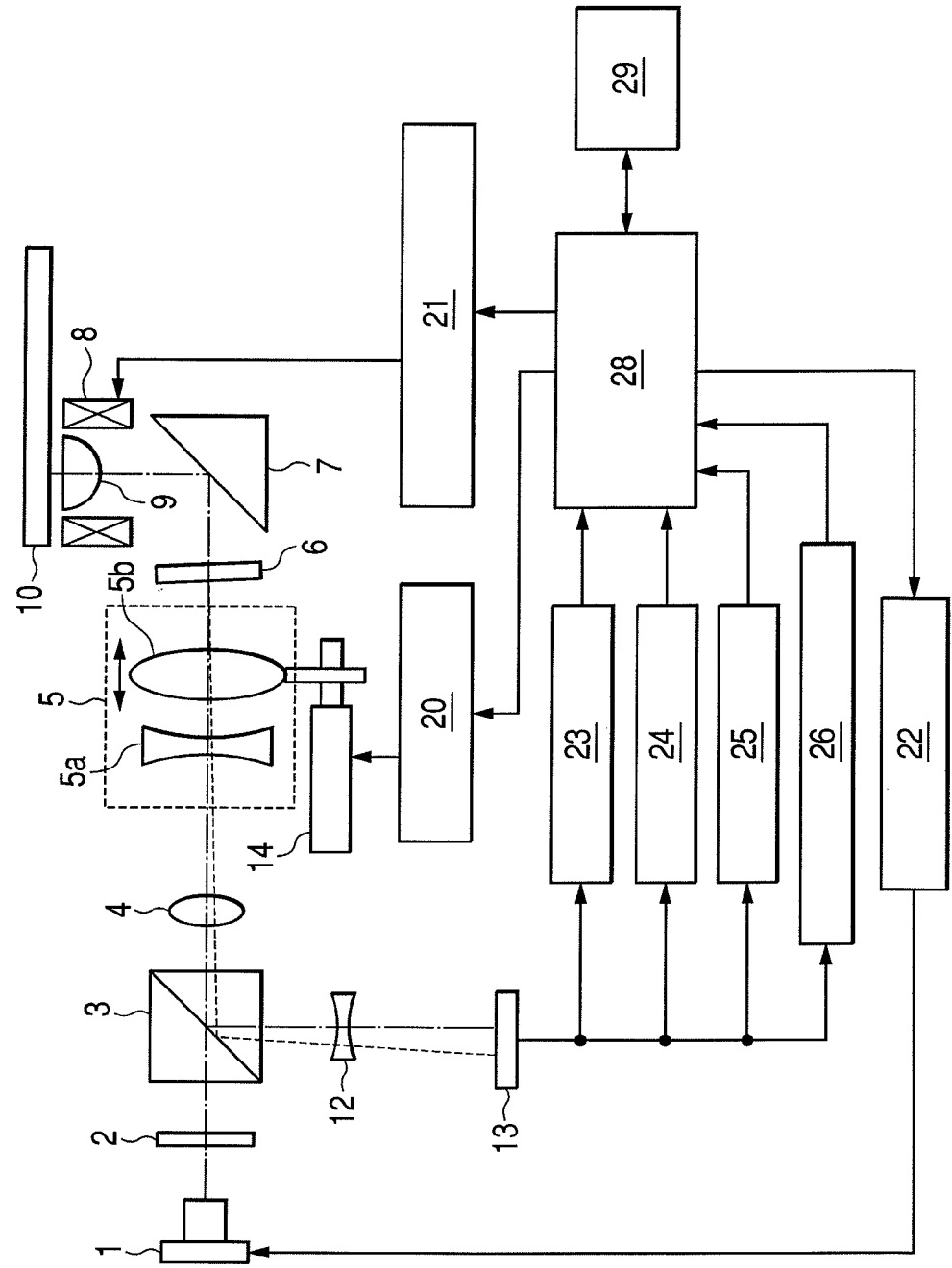
FIG. 4 is a block diagram illustrating Second Embodiment of the present invention.

FIG. 4 is a block diagram illustrating Second Embodiment of the present invention. In FIG. 4, the same symbols as in FIG. 1 are used to denote corresponding members. In this Embodiment, polarization beam splitter 3 for separating the forward light path and the backward light path is placed in the path of the divergent light beam emitted from semiconductor laser 1. This is different from Embodiment 1 in which the polarization beam splitter 3 is placed in the collimated light beam path. Other constitution and operation including spherical aberration compensation are the same as in First Embodiment. Therefore the detailed description thereof is omitted.

In this Embodiment, collimator lens 4 for parallelizing the divergent light beam emitted from semiconductor laser 1 serves also as the condenser lens for the returned light beam, in addition to the effect in First Embodiment. Therefore the number of the parts are further decreased, and the space between the light source and the collimator lens is utilized effectively for reducing the size of the apparatus.

Third Embodiment

Figure 5:
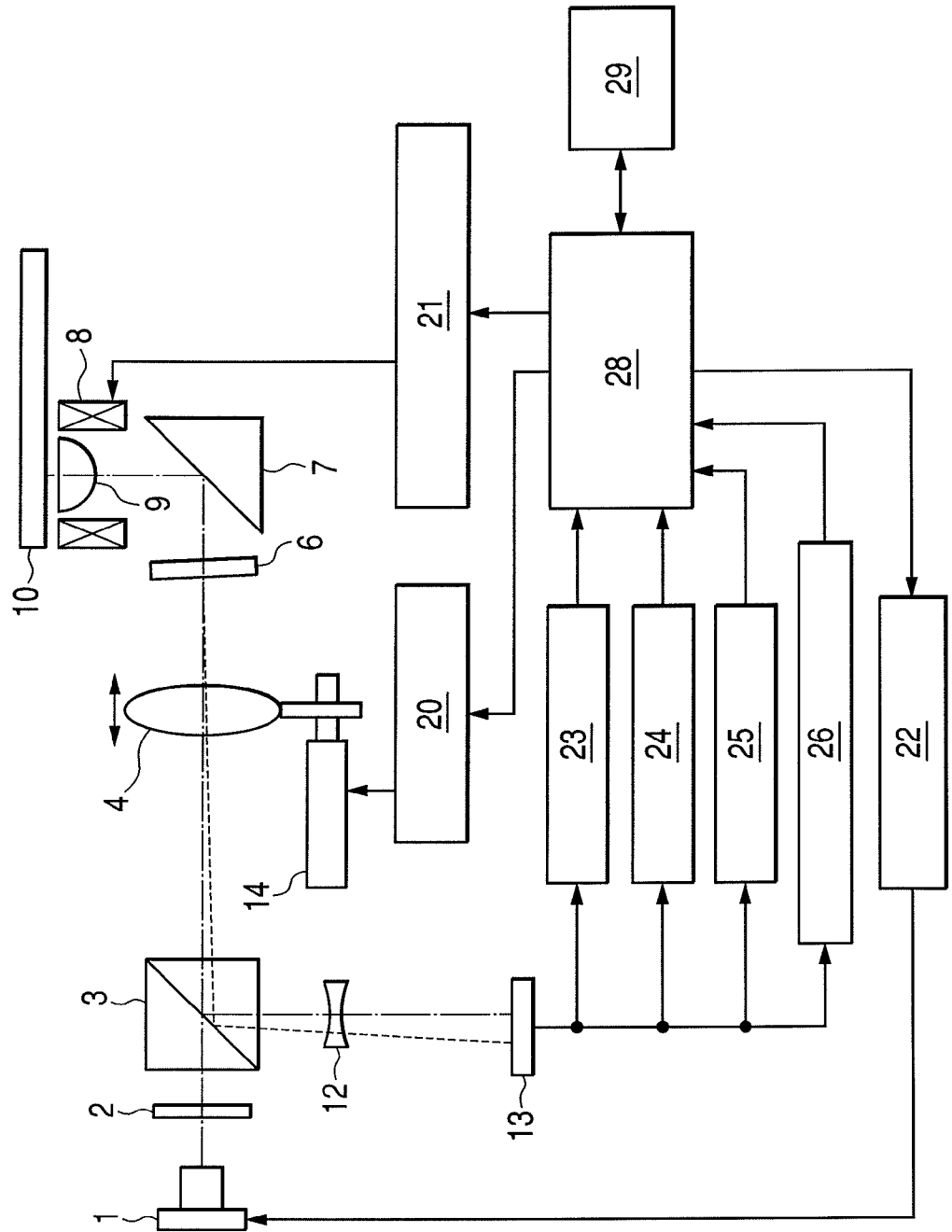
FIG. 5 is a block diagram illustrating Third Embodiment of the present invention.

FIG. 5 is a block diagram illustrating Third Embodiment of the present invention. In FIG. 5, the same symbols as in FIG. 1 are used to denote corresponding members. In this Embodiment, the divergence angle is converted by collimator lens 4. This is different from First Embodiment in which the beam expander is employed as the divergence angle-converting element. In this Third Embodiment, the divergence angle is converted by driving collimator lens 4. This collimator lens 4 is driven by driving mechanism 14 in the optical axis direction to compensate the spherical aberration in the same manner as in Embodiment 1.

The displacement of collimator lens 4 in the optical axis direction causes a change in the divergence angle signal in the same manner as shown in FIG. 3. Therefore, collimator lens 4 is placed at the standard position where the divergence signal is zero, and then the spherical aberration is compensated.

Other constitution and operation including spherical aberration compensation are the same as in First Embodiment. Therefore the detailed description thereof is omitted. In this Embodiment, the divergence angle-converting element is collimator lens 4. This collimator lens 4 serves also as condenser lens for condensing the light beam onto photodetector 13 of the focus error-detecting optical system.

In this Embodiment, collimator lens 4 serves as the beam expander as well as the condenser lens in the return path. Therefore, the number of the parts is further decreased in comparison with Second Embodiment.

Fourth Embodiment

Figure 6:
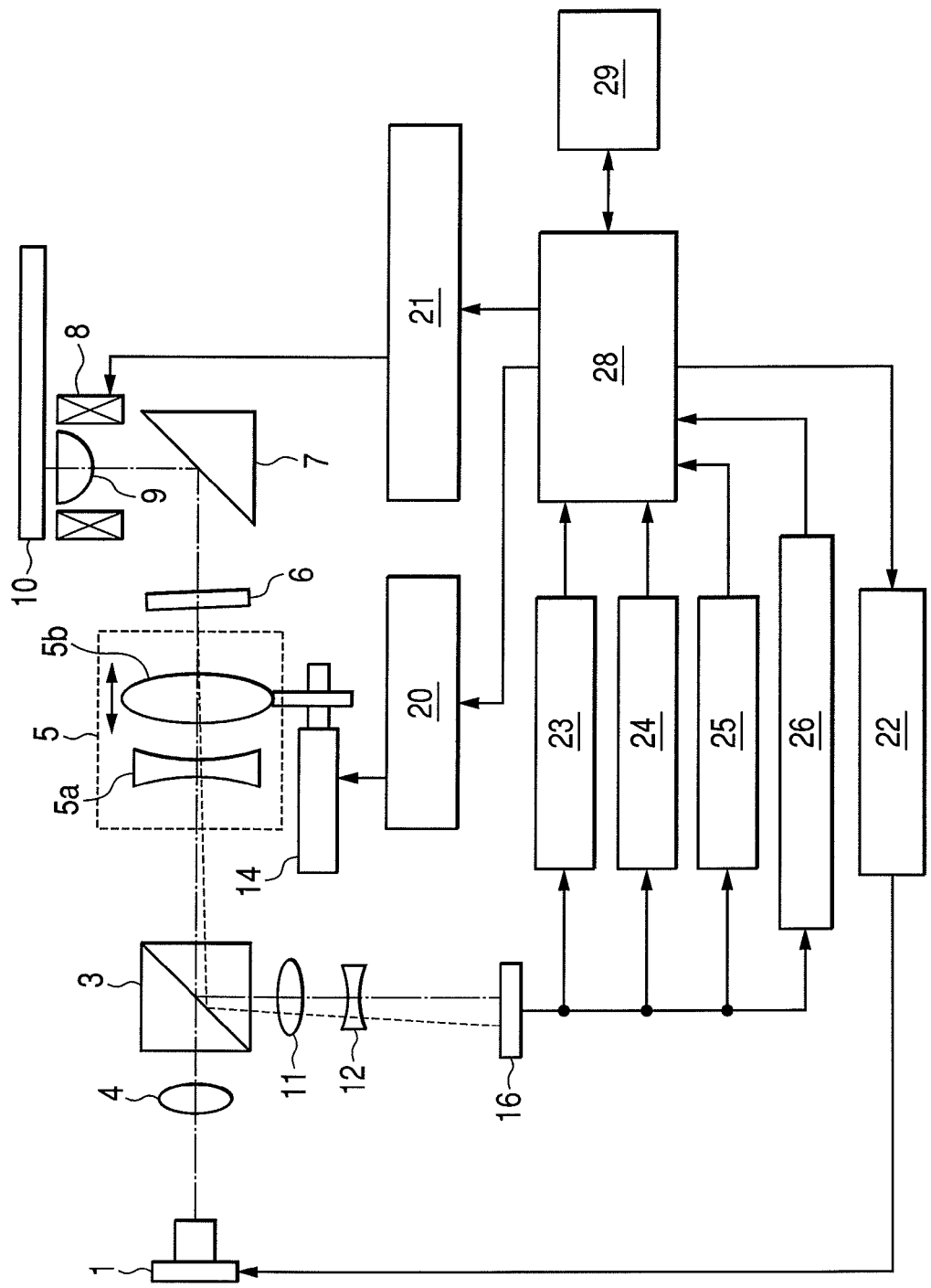
FIG. 6 is a block diagram illustrating Fourth Embodiment of the present invention.
Figure 7:
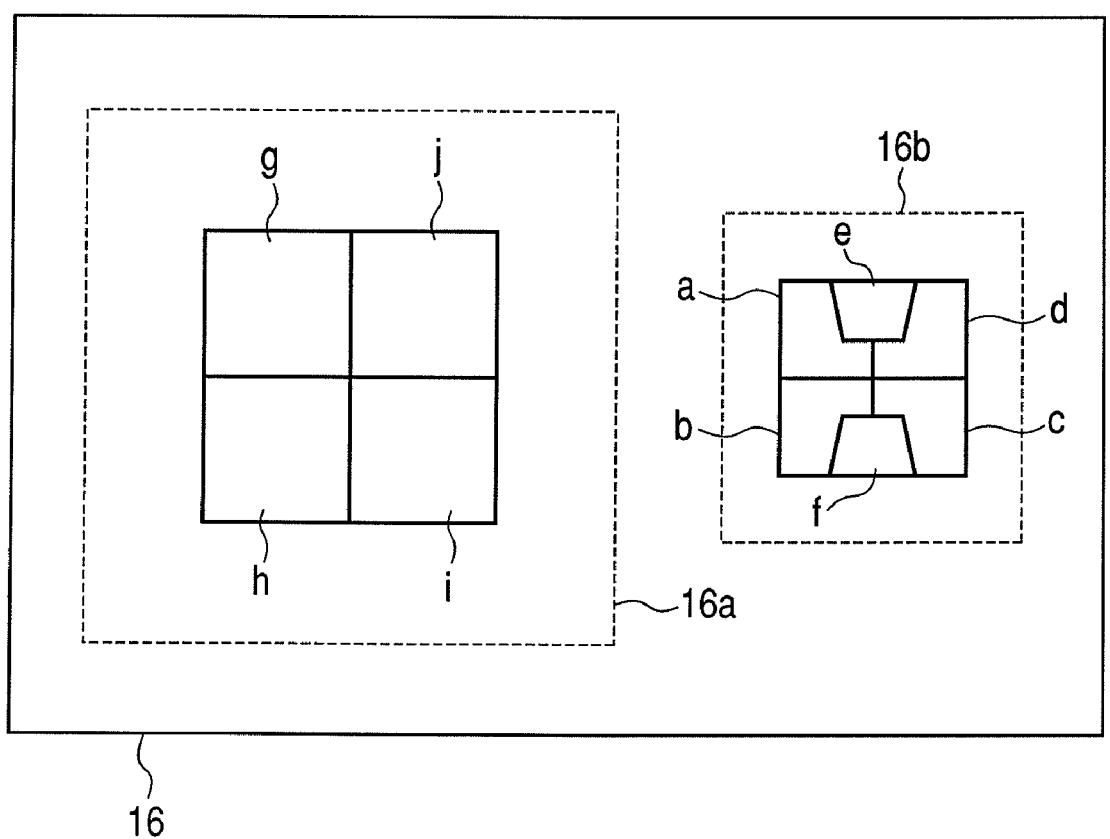
FIG. 7 illustrates a light-receiving surface of the photodetector shown in FIG. 6.

FIG. 6 is a block diagram of Fourth Embodiment of the optical information recording-reproducing apparatus of the present invention. Being different from the above embodiments, this Embodiment does not employ diffraction grating 2 and the light beam is not divided. Therefore, the constitution of the photodetector is different from that of First Embodiment. FIG. 7 illustrates the light-receiving surface of photodetector 16 having light-receiving surface sections 16a and 16b.

This apparatus contains light source 1, polarization beam splitter 3, collimator lens 4, beam expander 5, quarter-wave plate 6, folding mirror 7, objective lens actuator 8, objective lens 9, optical disk 10, condenser lens 11, sensor lens 12, lens-driving mechanism 14, and photodetector 16.

Semiconductor laser 1 as the light source emits a laser beam of a wavelength of, for example, 405 nm. Optical disk 10 as the information recording medium is a dual layered disk having first layer 10a and second layer 10b: second layer 10b being placed on the light-introducing side and having a light transmission layer of 75 μm thick, and first layer 10a being placed next to the second layer and having a light transmission layer of 100 μm thick for compensating the spherical aberration. Beam expander 5 is constituted of a concave lens 5a and convex lens 5b. Convex lens 5b is driven in the optical axis direction by lens-driving mechanism 14 to change the interval between concave lens 5a and convex lens 5b.

Lens-driving mechanism 14 is constituted of a driving source (e.g., a stepping motor) and a gear or a like mechanism for converting the driving force for driving convex lens 5b linearly in the optical axis direction. Controller 28 controls SA-driving circuit 20 to actuate driving mechanism 14 to adjust the position of convex lens 5b in the optical axis direction for compensation of the spherical aberration in the recording layers of optical disk 10.

Quarter-wave plate 6 is fixed at an inclination angle of 2.5 degrees relative to the optical axis, and is coated not to reflect the light of the light source wave length on the side facing toward beam-expander 5 with the other side face uncoated. Objective lens 9 has an NA of 0.85, and is designed for non-aberration in an infinite system at transmission layer thickness of 87.5 μm. Objective lens actuator 8 has a two-axis driving mechanism for driving the objective lens in the focusing direction and the radius direction of optical disk 10. Objective lens 9 is held by objective lens actuator 8.

Sensor lens 12 is an astigmatism element which is constituted, for example, of a cylindrical lens, a hologram element, or a like device, and functions to cause astigmatism. Photodetector 16 has a light-receiving surface patterned as illustrated in FIG. 7.

RF-detecting circuit 23 produces an RF-reproduction signal from the output of photodetector 16. Servo error-detecting circuit 24 produces a focus error signal and a tracking error signal similarly from the output of photodetector 16. Divergence angle-detecting circuit 25 produces a divergence angle signal similarly from the output of photodetector 16. Laser power monitor detecting circuit 26 produces a laser power monitor signal similarly from the output of photodetector 16.

Controller 28 has a controlling circuit for controlling the parts in the apparatus for recording or reading the information on or from optical disk 10. Further, controller 28 drives objective lens actuator 8 for focusing and tracking in accordance with the aforementioned focusing error signals and tracking error signals. In FIG. 6, the details of the constitution of the servo control are omitted. Controller 28 controls semiconductor laser 1 in accordance with the above-mentioned laser power monitor signals. In FIG. 6, the modulation circuit for modulating the recorded data according to a prescribed modulation system, and the demodulation circuit for the demodulation are omitted, and mechanisms like the spindle motor for rotating optical disk 11 are also omitted.

The light beam emitted from semiconductor laser 1 is converted to a collimated light beam by collimator lens 4, allowed to transmit through polarization beam-splitter 3, and introduced into beam expander 5 constituted of concave lens 5a and convex lens 5b. Beam expander 5, which has convex lens 5b movable in the optical axis direction, is capable of varying the angle of divergence or convergence of the light beam to be introduced to objective lens 9.

The light beam, after transmission through beam expander 5, is introduced to quarter-wave plate 6, where a part of the light beam is separated by Fresnel reflection on the plate face on the light-emission side. The reflected light transmits through quarter-wave plate 6 backward again. Thereby, the polarization direction of the reflected light is changed to be perpendicular to that of the introduced light. Quarter-wave plate 6, which is set with inclination relative to the optical axis direction, deviates the optical axis of the separated light beam from that of the original transmission direction. This separated light beam is allowed to transmit again through beam expander 5, reflected by polarization beam splitter 3, allowed to pass through condenser lens 11 and sensor lens 12 and condensed on light-receiving surface 16a of photodetector 16. Light-receiving surface 16a produces a divergence angle signal and a laser power monitor signal.

On the other hand, the light beam which has transmitted through quarter-wave plate 6 is reflected upward by folding mirror 7, and is condensed by objective lens 9 on the information recording face of optical disk 10. The light reflected by optical disk 10 is transmitted backward through objective lens 9, folding mirror 7, quarter-wave plate 6, and beam expander 5 to polarization beam splitter 3. The introduced light is reflected by polarization beam splitter 3, and is condensed through condenser lens 11 and sensor lens 12 on light-receiving surface 16b of photodetector 16. Light-receiving surface 16b outputs an RF reproduction signal, a focus error signal, and a tracking error signal.

FIG. 7 illustrates the light-receiving surface of photodetector 16. Light-receiving surface section 16b for RF-servo contains six divisional sensors (a, b, c, d, e, and f). Divisional sensors e and f contain interference regions for causing interference between the diffracted light beam formed by the track and the zero-order light beam to give a so-called push-pull signal, whereas the divisional sensors a-d do not contain the interference region, and are less liable to be affected by groove-crossing. Light-receiving surface section 16a contains four divisional sensors g-j.

The outputs from divisional sensors a-j of photodetector 16 are denoted respectively by symbols A-J. Focus error signal FE is derived according to an astigmatism method by calculation by Equation 6 below.

$$FE=(A+C)-(B+D) \quad (6)$$

Tracking error signal TE is derived by calculation by Equation 7.

$$TE=(F-E)-k\{(A+D)-(B+C)\} \quad (7)$$

In this Equation, the term (A+D)−(B+C) corresponds to a lens position signal for canceling the lens shift fraction of the push-pull signal component derived by (F−E). The above focus error signal and the tracking error signal are produced by servo error-detecting circuit 24 and are input to controller 28.

The RF reproduction signal is derived by summation of the outputs of six divisional sensors.

$$(\text{RF reproduction signal})=A+B+C+D+E+F \quad (8)$$

This RF reproduction signal is produced by RF detection circuit 23 as mentioned above, and is input to controller 28.

Further, the laser power monitor signal is derived by summation of the outputs from four divisional sensors g-j.

$$(\text{Laser power monitor signal})=G+H+I+J \quad (9)$$

This laser power monitor signal is produced by laser power monitor signal-producing circuit 26 and is input to controller 28. The output of semiconductor laser 1 is controlled by APC in accordance with this laser power monitor signal.

Further, the divergence angle signal is derived by an astigmatism method by calculation by Equation 10.

$$(\text{Divergence angle signal})=(G+I)-(H+J) \quad (10)$$

This divergence angle signal is produced by divergence angle-detecting circuit 25, and is input to controller 28.

The compensation of the spherical aberration by beam expander 5 is conducted in the same manner as in Embodiment 1. In the compensation, the divergence angle signal changes depending on the position of the lens along an S-shaped curve like that shown in FIG. 3. The convex lens is moved to a standard position on which the divergence angle signal becomes zero. The compensation of the spherical aberration for the respective recording layers of the optical disk conducted in the same manner as in Embodiment 1.

In this Embodiment, the light-receiving surface of the photodetector can be made smaller in comparison with that of Embodiment 1, since the light beam is not divided. Therefore this Embodiment is suitable for size reduction of the photodetector and of the apparatus.

Fifth Embodiment

Figure 8:
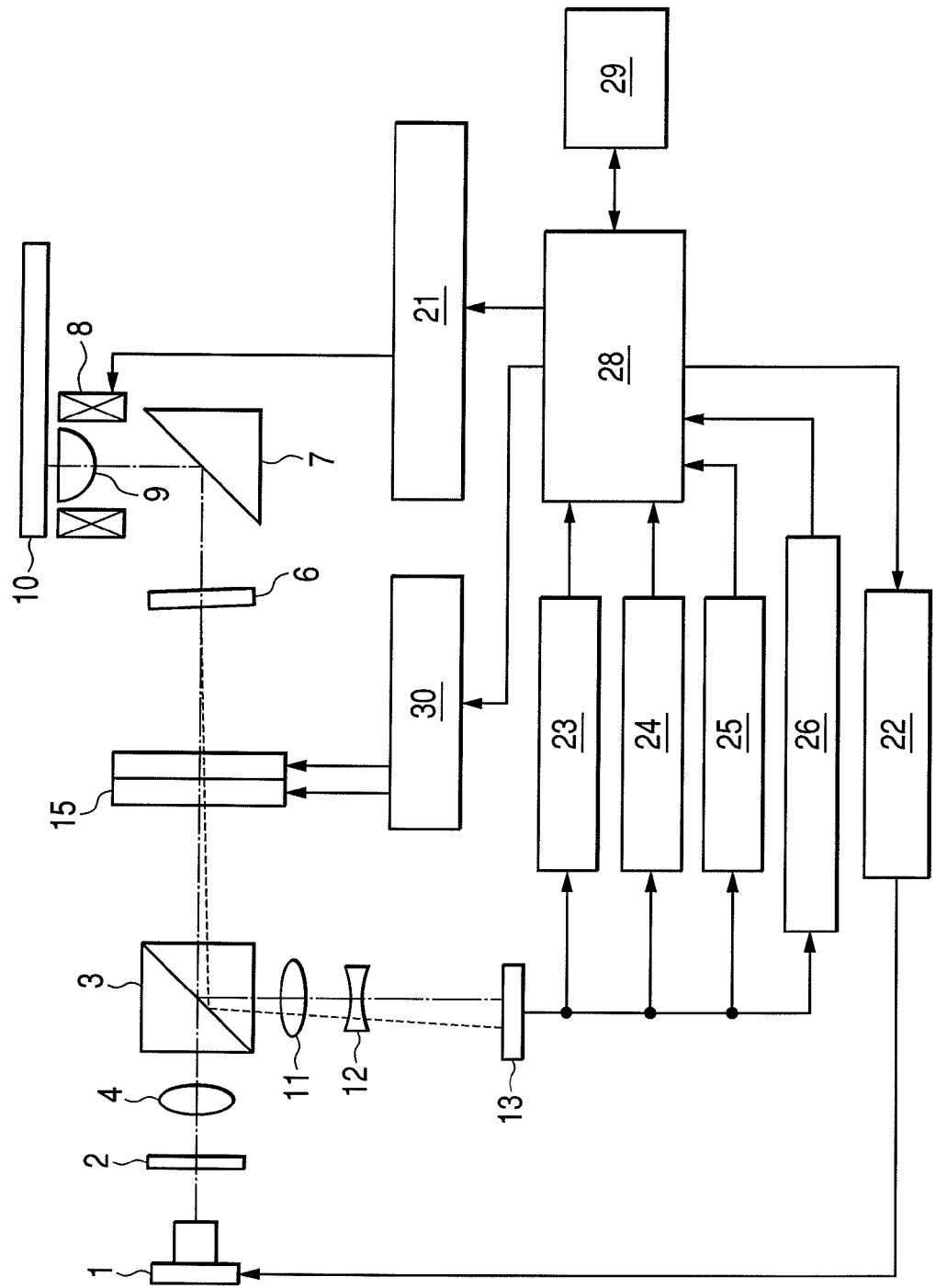
FIG. 8 is a block diagram illustrating Fifth Embodiment of the present invention.

FIG. 8 is a block diagram illustrating Fifth Embodiment of the present invention. In FIG. 8, the same symbols as in FIG. 1 are used to denote corresponding members. In this Embodiment, liquid crystal element 15 is employed in place of the beam expander as the divergence angle-converting element in Embodiment 1. Liquid crystal 15 is driven by liquid crystal driving circuit 30. Otherwise the constitution is the same as that illustrated in FIG. 1.

Figure 9:
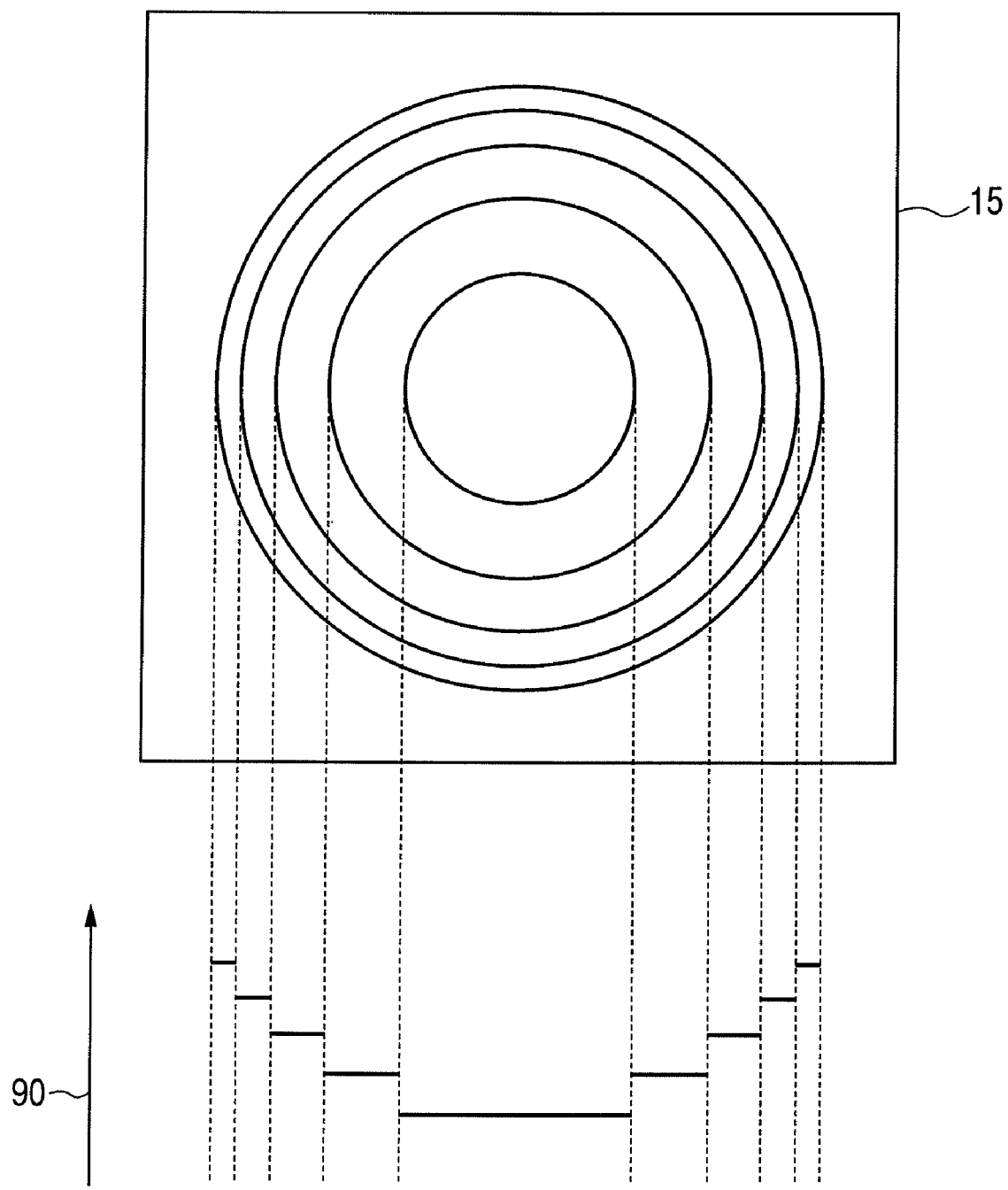
FIG. 9 illustrates the electrode pattern of the liquid crystal element shown in FIG. 8.
Figure 10:
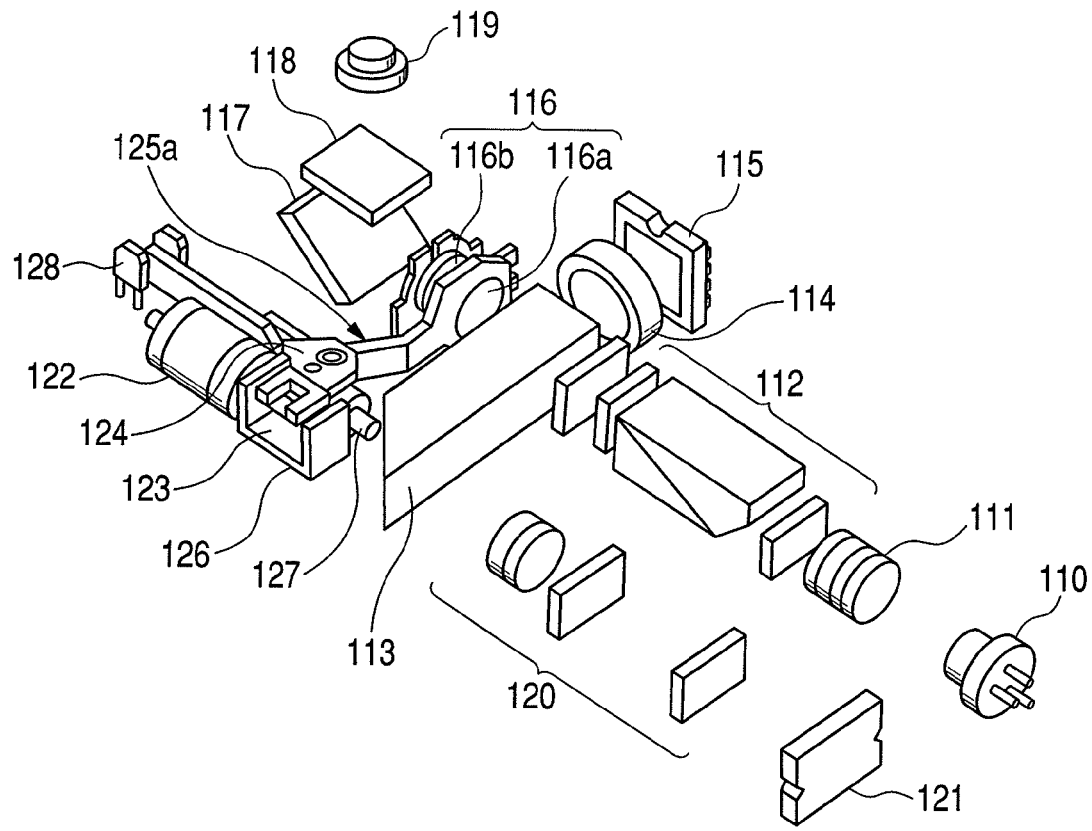
FIG. 10 illustrates a conventional recording-reproducing apparatus (prior art).

The electrode pattern of liquid crystal element 15 is divided into five concentric portions as illustrated in FIG. 9. The state of divergence or convergence of the emitted light beam can be changed by applying optical phase difference from the center to the periphery stepwise. This liquid element is constituted of two superposed element sheets having the same pattern but being oriented perpendicularly for controlling the forward and backward linearly polarized light beam.

The light beam emitted from semiconductor laser 1 is converted to a collimated light beam by collimator lens 4, and is allowed to transmit through polarization beam splitter 3 and liquid crystal element 15, successively. This transmitted light beam is introduced to quarter-wave plate 6, where a part of the light beam is separated by Fresnel reflection at the light-emission side face of the plate. The reflected light transmits through quarter-wave plate 6 backward again. Thereby, the polarization direction of the reflected light is changed to be perpendicular to that of the introduced light. Quarter-wave plate 6, which is set with inclination relative to the optical axis direction, deviates the optical axis of the separated light beam from that of the original transmission direction. This separated light beam is allowed to transmit again through liquid crystal element 15, reflected by polarization beam splitter 3, allowed to pass through condenser lens 11 and sensor lens 12, and condensed on light-receiving surface 13a of photodetector 13. Light-receiving surface 13a outputs a divergence angle signal and a laser power monitor signal.

On the other hand, the light beam which has transmitted through quarter-wave plate 6 is reflected upward by folding mirror 7, and is condensed by objective lens 9 on the information recording face of optical disk 10. The light reflected by optical disk 10 is introduced through objective lens 9, folding mirror 7, quarter-wave plate 6, and liquid crystal element 15 to polarization beam splitter 3. The introduced light is reflected by polarization beam splitter 3, and is condensed through condenser lens 11 and sensor lens 12 onto light-receiving surface 13b of photodetector 13. Light-receiving surface 13b outputs RF reproduction signals, focus error signals, and tracking error signals.

In this Embodiment, liquid crystal element 15 is employed as the divergence angle-converting element. Spherical aberration in the respective recording layers of optical disk is compensated by applying an adjusted driving voltage from liquid crystal-driving circuit 30 to the interval between the two superposed element sheets of liquid element 15. In the aberration compensation, the divergence angle signal changes depending on the driving voltage along an S-shaped curve like that shown in FIG. 3. Therefore, for compensation of the spherical aberration in the respective recording layer of the optical disk, firstly preferably, the driving signal of the liquid crystal element 15 is adjusted to make the divergent angle signal to be zero, and then the spherical aberration is adjusted in the same manner as in Embodiment 1.

In this Embodiment, a liquid crystal element is employed for divergence and convergence of the light beam to reduce the constituting parts, whereby the apparatus size is made smaller and the operation is stabilized. In particular, the focus servo can surely be introduced to the optical disk by adjusting the driving signal for the liquid crystal in accordance with the divergence angle signal.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2007-151642, filed Jun. 7, 2007, which is hereby incorporated by reference herein in its entirety.

What is claimed is:

1. An optical information recording-reproducing apparatus comprising:
   a light source;
   an objective lens for condensing a light beam from the light source on a recording layer of an optical recording medium;
   a divergence angle-converting element provided in an optical path from the light source to the optical recoding medium for converting a divergence angle of the light beam to be introduced to the objective lens;
   a focus error detecting optical system including a photodetector for detecting a focus error of the light beam;
   an optical element for introducing a part of the light beam emitted from the divergence angle-converting element to the focus error detecting optical system;
   a circuit for detecting the divergence angle of the light beam emitted from the divergence angle-converting element from output from the photodetector; and
   a circuit for compensating spherical aberration in the recording layer of the optical recording medium by driving the divergence angle-converting element in accordance with the detection result of the divergence angle-detecting circuit.

2. The optical information recording-reproducing apparatus according to claim 1, wherein the optical element is a polarization-converting element for converting linear polarized light to circularly polarized light.

3. The optical information recording-reproducing apparatus according to claim 1, wherein the focus error-detecting optical system has an astigmatism-generating element.

4. The optical information recording-reproducing apparatus according to claim 1, wherein the divergence angle-converting element is a beam expander, a collimator lens, or a liquid crystal element.

5. The optical information recording-reproducing apparatus according to claim 4, wherein the collimator lens functions also as a condenser lens for condensing the light beam on the photodetector of the focus error-detecting optical system.

* * * * *